United States Patent [19]

Skow

[11] 4,201,187
[45] May 6, 1980

[54] MODULAR SOLID FUEL FURNACE SYSTEM

[75] Inventor: Lynn R. Skow, North Branch, Minn.

[73] Assignee: Gemini Systems, Inc., North Branch, Minn.

[21] Appl. No.: 940,747

[22] Filed: Sep. 8, 1978

[51] Int. Cl.$^2$ ............................................. F24H 3/02
[52] U.S. Cl. ................................ 126/110 E; 110/190; 110/192; 110/297; 126/99 A; 126/109; 126/112; 165/DIG. 2
[58] Field of Search .......................... 165/DIG. 2, 11; 126/99 A, 109, 110 R, 110 E, 72, 112, 77, 15 R, 15 A, 146, 193; 110/190, 192, 300, 297

[56] References Cited

U.S. PATENT DOCUMENTS

| | | | |
|---|---|---|---|
| 776,053 | 11/1904 | Gifford | 126/116 R |
| 1,218,974 | 3/1917 | Brennan | 126/36 |
| 1,567,001 | 12/1925 | Thompson | 110/262 |
| 1,865,045 | 6/1932 | Powell | 110/262 |
| 2,014,868 | 9/1935 | Steele et al. | 126/15 A |
| 2,471,351 | 5/1949 | Russell | 126/121 |
| 2,713,861 | 7/1955 | Biddle et al. | 126/36 |
| 3,111,978 | 11/1963 | Peoples | 158/1 |
| 3,266,480 | 8/1966 | Miller et al. | 126/109 |
| 3,552,361 | 1/1971 | Helpio | 122/22 |
| 4,020,822 | 5/1977 | Harris | 126/112 |
| 4,045,263 | 8/1977 | Moore et al. | 165/11 |
| 4,050,440 | 9/1977 | Lessin | 126/120 |
| 4,055,297 | 10/1977 | Lee | 236/11 |
| 4,078,541 | 3/1978 | Roycraft | 126/112 |
| 4,103,735 | 8/1978 | Warner | 165/DIG. 2 |
| 4,106,474 | 8/1978 | Hunter et al. | 165/DIG. 2 |
| 4,131,779 | 12/1978 | Tatsukawa et al. | 126/193 |
| 4,136,662 | 1/1979 | Willson | 126/77 |
| 4,149,671 | 4/1979 | Cagle | 126/112 |

Primary Examiner—James C. Yeung
Assistant Examiner—Daniel J. O'Connor
Attorney, Agent, or Firm—Orrin M. Haugen; Thomas J. Nikolai

[57] ABSTRACT

A solid fuel burning system which may be readily combined with a conventional fluid fuel burning furnace in a forced air heating system. The solid fuel burning system comprises, in combination, a draft inducing blower which directs air for combustion into the furnace at a point proximate the burning fuel. Baffle walls are provided which separate the smoke and other products of combustion from the clean air to be heated and a novel heat exchanger comprised of a plurality of elongated tubes provide a relatively large heat transfer surface. The furnace is specifically designed to facilitate periodic cleaning of the interior walls of the heat exchanger where creosote and other products of combustion may accumulate. In addition, the system employs a novel electronic control circuit which is tied in with the room thermostat and with a thermocouple disposed within the solid fuel burning furnace. The output of the thermocouple is amplified and applied to a series of comparators whose outputs are used to perform various control functions. Specifically, the output from a first comparator indicates that a fire is present in the wood burning unit. A timer mechanism comprised of electronic circuitry becomes operational upon closure of the room thermostat contacts and if the temperature present in the solid fuel burning furnace does not exceed a predetermined threshold within a given period of time, a relay is rendered operational to switch in the fluid fuel furnace.

Additional comparators and digital logic circuitry is used to control the rate of burning of the solid fuel by modulating the on/off condition of the draft inducing blower.

2 Claims, 7 Drawing Figures

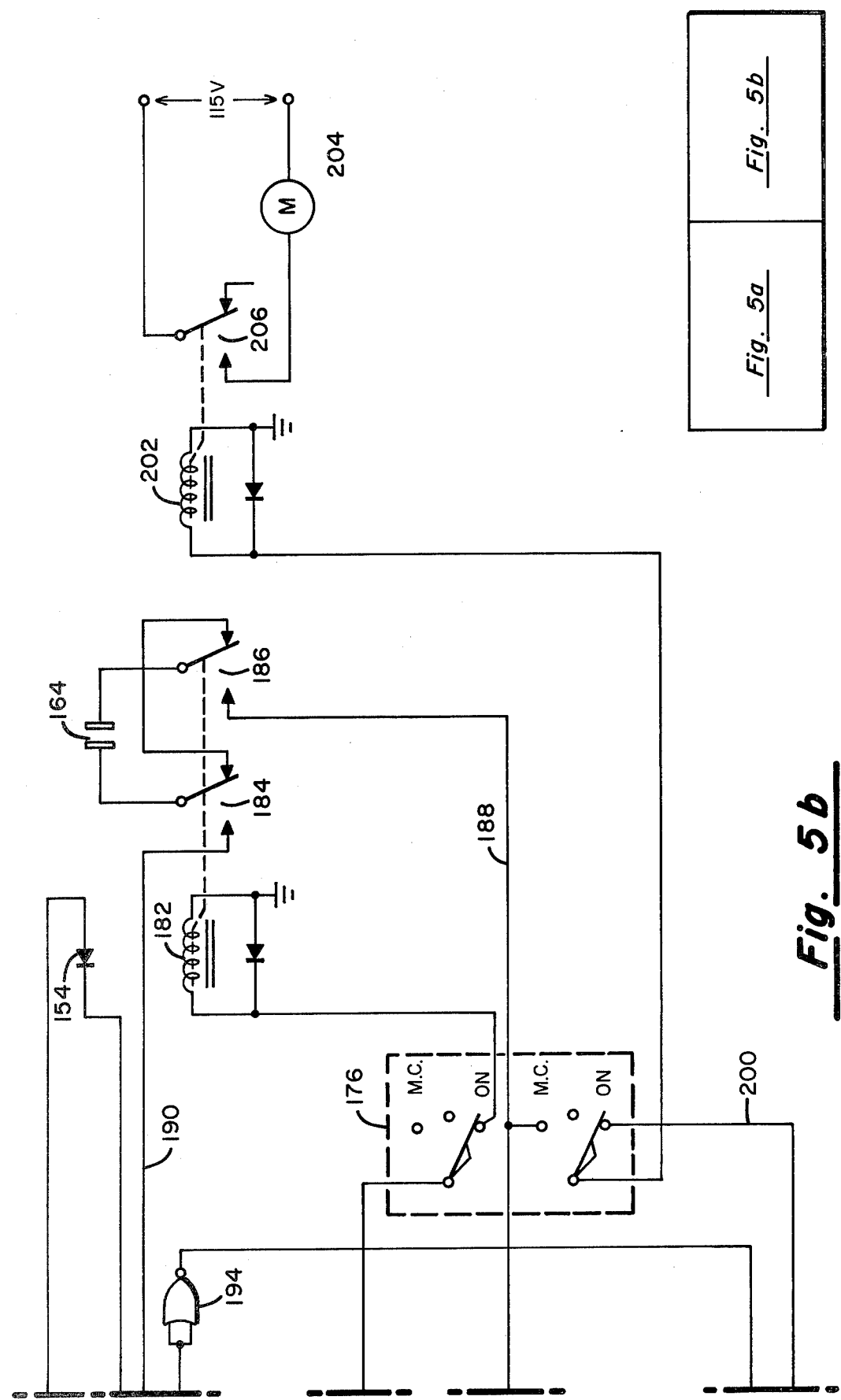

MODULAR SOLID FUEL FURNACE SYSTEM

BACKGROUND OF THE INVENTION

I. Field of the Invention

This invention relates generally to a forced air heating system, and more specifically to the construction and operation of a solid fuel burning furnace which is designed to operate in conjunction with a conventional fluid (gas or oil) fueled furnace so that compatibility exists.

II. Discussion of the Prior Art

With the availability of fuel oil and natural gas in limited supply, it becomes advantageous to utilize solid fuel including wood and coal as an auxiliary heat source in homes and commercial establishments. Thus, it is desirable to have a solid fuel burning unit which can be tied in directly with a conventional natural gas or oil burning furnace in a forced air heating system.

There is disclosed in the prior art furnace structures which are specially designed to utilize both solid and fluid fuel. For example, the structure set forth in the Gifford U.S. Pat. No. 776,053 allows solid fuel to be burned in a firepot and a fluid-fuel burner is included in the same furnace cabinet but separated from the solid fuel burning portion by suitable baffle plates. Thus, it is not new in the art to utilize both solid fuel and fluid fuel in a same furnace structure. Similarly, the Biddle et al U.S. Pat. No. 2,713,861 describes a stove used for cooking purposes which may be alternately fueled with either a solid fuel or a fluid fuel.

I am also aware of the Lee U.S. Pat. No. 4,055,297 which describes the manner in which a solid fuel consuming furnace can be tied into a forced air heating system along with a conventional electric or fluid fueled heater. In the Lee system, the temperature at various points in the system is monitored and the control circuitry operates through motor arrangements to control the flow of heated air through the various ducts included in the system.

The present invention is more closely related to the system described in the Lee Patent than to those described in the aforereferenced Gifford and Biddle Patents, but differs significantly therefrom in the manner in which overall control is maintained. As such, it is believed that the present invention constitutes a significant improvement in the art.

SUMMARY OF THE INVENTION

The solid fuel burning furnace of the present invention comprises a rectangular parallelepiped cabinet structure. Located proximate the base of the cabinet is a firebox which may be loaded with coal or wood. A draft inducer or blower is provided with its output proximate the center of the firebox and a set of diffusion nozzles direct the air from the blower into the firebox. The heated and smoke ladened air is channeled through a chamber formed at the rear of the furnace cabinet and made to flow through a plurality of cylindrical tubes comprising a portion of the heat exchanger. Clean air is brought in to the unit proximate the base thereof and is heated by conduction and radiation and allowed to pass through a second chamber also located proximate the rear of the cabinet. The clean air is separated from the smoke ladened air by a suitable rear panel member. The clean air is then passed through and around the tubular members of the heat exchanger and then drawn into the heating ducts of the building.

The smoke ladened air flowing through the tubes comprising the heat exchanger may tend to cause creosote and other products of combustion to build up on the inside walls thereof. A heat exchanger access door is provided on the front of the cabinet and, when opened, permitting a circular scraper to be inserted into the tubular heat exchange members for removing the creosote and other debris from the tubes, allowing it to fall into the firebox.

In order to render the solid fuel furnace system of the present invention compatible with a conventional fluid fueled heating system, there is also provided electronic circuitry for controlling the operation of both the solid fuel and fluid fuel burning units. By virtue of this circuitry, the solid fuel burning unit is given priority over the fluid fuel burning unit. More specifically, a thermocouple is disposed at a predetermined point in the solid fuel furnace construction for monitoring the temperature at that point. The signal resulting from the thermocouple is amplified and applied to a plurality of comparator circuits. The output of a first comparator is used to signal the fact that a fire is present in the solid fuel burner. When a room thermostat, located in the space to be heated, signals the need for additional heat by having its contacts closed, power is applied to the draft inducing blower and the fuel is therefore consumed at a higher rate, tending to elevate the temperature in the furnace. At this same time, an electronic timer network becomes operational and if the temperature being sensed by the thermocouple fails to reach a predetermined threshold within a given time period, a relay is operated for causing the fluid fueled furnace to come on. However, if the temperature sensed in the solid fuel furnace does reach the predetermined threshold within the time period allotted, the fluid fueled unit will be locked out.

Additional comparator circuits also examine the output from the thermocouple unit for controlling or modulating the operation of the draft inducing blower. That is, when the temperature exceeds a different predetermined threshold, the circuitry comes into play to shut off the draft inducing blower. Then, when the temperature being sensed falls below still another threshold, the draft inducing blower will again be turned on. In this fashion the amount of heat produced by the solid fuel furnace and the rate of fuel consumption can be controlled.

The control circuitry also incorporates an indicator located proximate the room thermostat which provides an indication to the user that the solid fuel burning furnace is functioning to supply the heat demand for the building or that it is the fluid fueled system that is controlling.

OBJECTS

It is accordingly a principal object of the present invention to provide a new and improved solid fuel burning furnace structure.

Another object of the invention is to provide a solid fuel burning furnace structure which may be used as a free-standing unit or in combination with a fluid fueled furnace in a forced air heating system.

Still another object of the invention is to provide a solid fuel burning furnace having control circuitry for rendering it compatible with a fluid fuel furnace system so that the fluid fuel furnace system acts as an auxiliary or backup heating source for the building.

These and other objects and advantages of the invention will become apparent to those skilled in the art from the following detailed description of the preferred embodiment when considered in conjunction with the accompanying drawings in which like parts in the several views are referred to by corresponding numerals.

DESCRIPTION OF THE DRAWINGS

FIG. 5a and 5b, when arranged as in FIG. 5, is a schematic electrical diagram of the control circuitry utilized with the preferred embodiment.

DESCRIPTION OF THE PREFERRED EMBODIMENT

Figure 1:
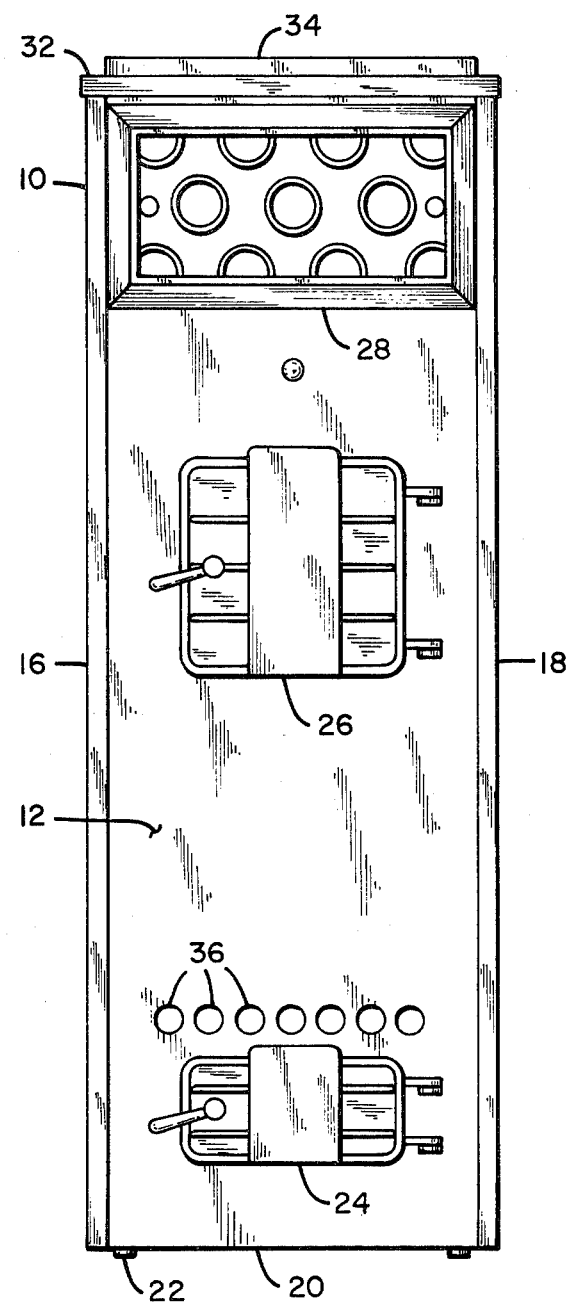
FIG. 1 is a front elevation of the solid fuel burning furnace constituting the preferred embodiment.

First, with reference to FIGS. 1 through 4 of the drawings, consideration will be given to the construction and mode of operation of the solid fuel burning unit of the present invention. As can be seen, the furnace, indicated generally by numeral 10, comprises a cabinet having the form of a rectangular parallelepiped defined by a front panel member 12, a rear panel member 14 and left and right side panel members 16 and 18. The cabinet rests upon a base member 20 having jack pads 22 for leveling purposes.

Figure 2:
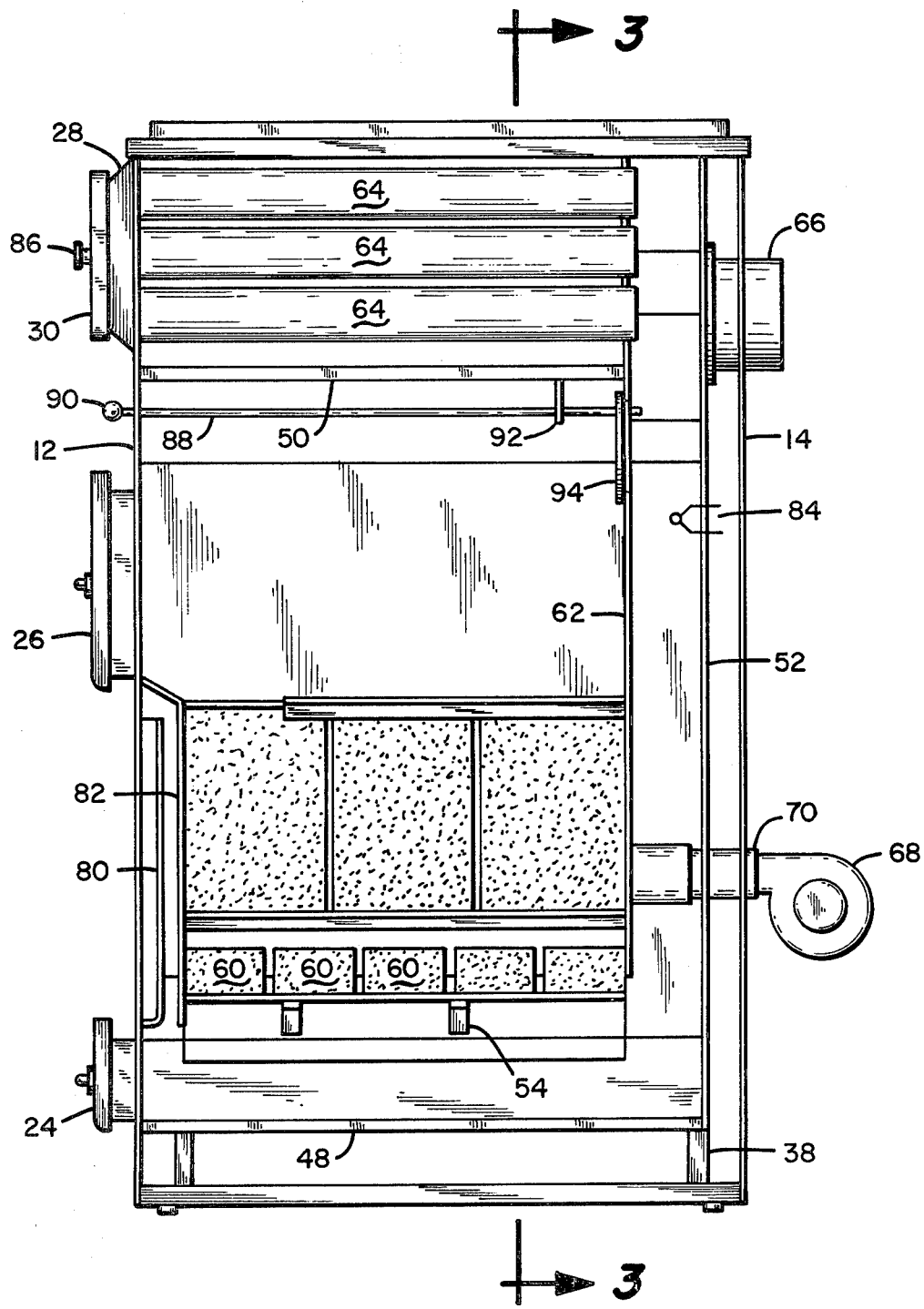
FIG. 2 is a side sectional view with the side panel removed to show the internal construction of the preferred embodiment.
Figure 4:
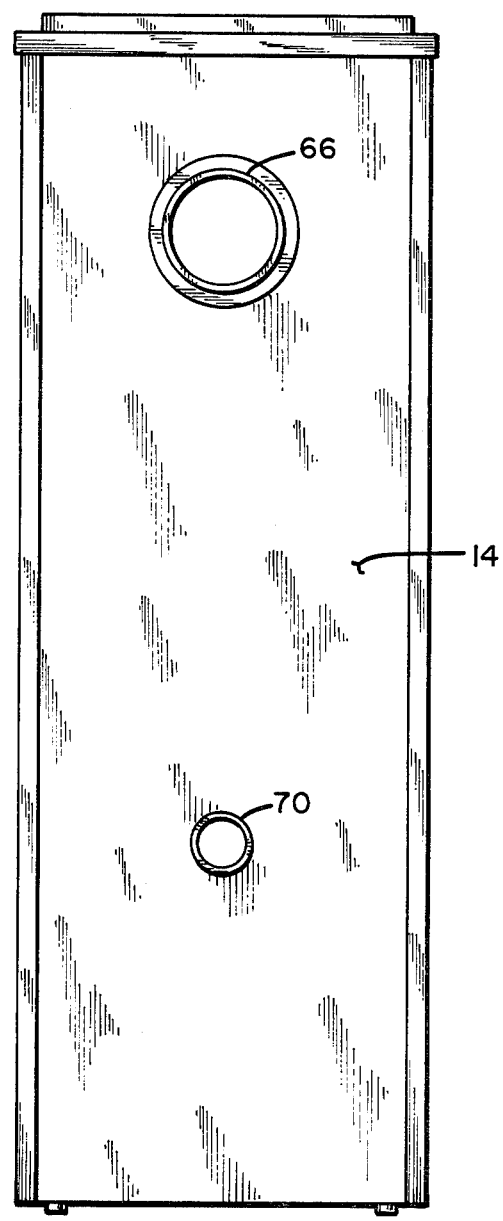
FIG. 4 is a rear elevation of the preferred embodiment.

With reference to FIG. 1, on the front panel 12 there are provided a plurality of access doors. Specifically, an access door 24 is formed proximate the lower portion or base and when opened, allows the user to clean out ashes and other debris from the firebox, the details of which are yet to be described. The access door 26 formed in the front panel 12 is the door through which fuel in the form of coal, wood or other solid materials may be loaded into the furnace. Above the door 26 is a manifold member 28 and bolted to the manifold is a heat exchanger access door 30 (FIG. 2). This door has been removed in the view of FIG. 1 to show the end view of the heat exchanger tubes to be described.

Disposed on the top plate 32 of the cabinet is a cabinet cap or outer furnace shroud 34 which is generally rectangular in construction and provides a flange whereby the person installing the unit in a building may connect a hot air plenum which communicates with the heating ducts used within the building.

Located immediately above the lower access door 24 are a plurality of circular apertures 36 which are formed through the front panel 12 so as to premit the inflow of secondary air which, as will be further described, contributes to a more complete combustion of the fuel and the flammable gases given off thereby.

Figure 3:
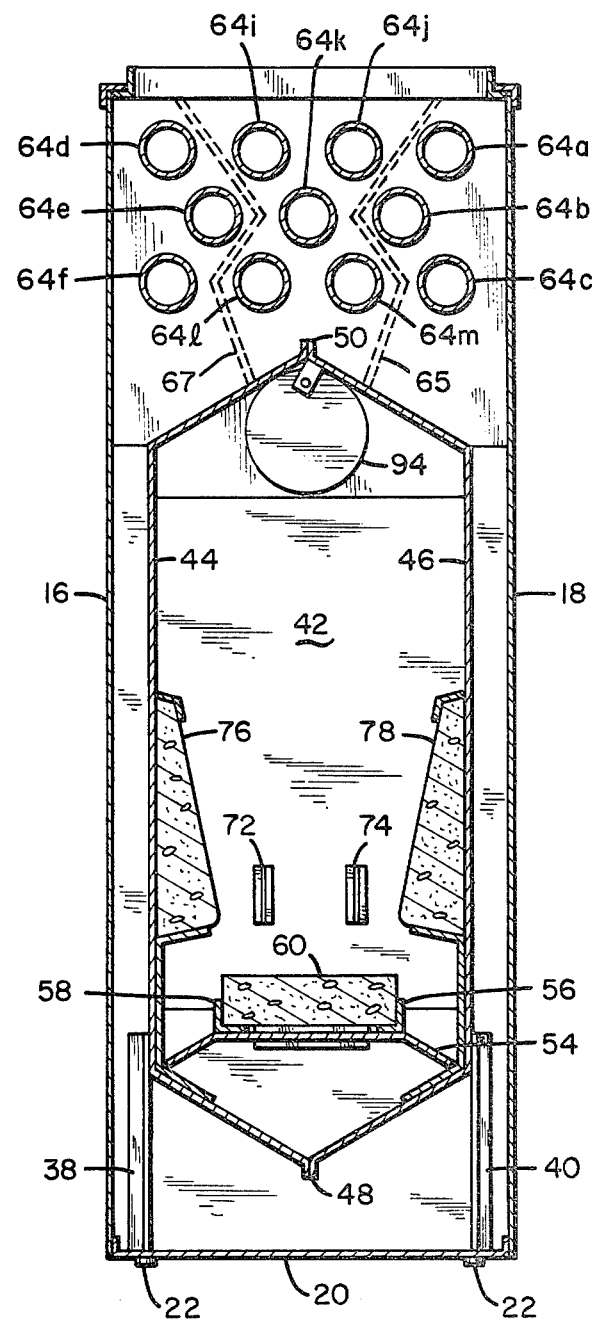
FIG. 3 is a front sectional view taken along the lines 3—3 in FIG. 2.

With reference to FIGS. 2 and 3, the internal construction of the furnace unit will next be described. As is shown in FIG. 3, first and second angle iron support posts 38 and 40 are welded to the frame and provide a support for the firebox indicated generally by numeral 42. The firebox 42 includes first and second sheet metal panels 44 and 46 which are bent towards one another at each end and joined as by welding along seams 48 and 50. The panels 44 and 46 extend between the front panel of the cabinet 12 but terminate short of the rear panel 14. The firebox 42 is sealed at its rear end by a rear panel 52 (FIG. 2) which is located inward of and spaced parallel to the rear panel 14 of the cabinet.

Disposed within the firebox 42 is a support bracket 54 which is suspended within the firebox 42 and which serves as a base for a pair of angle iron brackets 56 and 58. The vertically extending edges of the brackets 56 and 58 are spaced apart from one another a predetermined distance so that a plurality of fire bricks 60 are supported thereby.

Extending across the width dimension of the furnace cabinet 10 and inward of the rear panel 52 is a further wall member 62, the spacing between the rear panel 52 and the wall member 62 defining a smoke and hot air passageway which extends upwardly. This panel is provided with a plurality of circular apertures to accommodate or receive the ends of a corresponding plurality of tubular heat exchange members 64 which run parallel to the base of the furnace and extend over to the front panel 12 of the cabinet. These hollow tubes provide a conduit whereby the hot gases and smoke traverse the heat exchanger portion of the furnace which is that portion lying above the firebox 42. Baffle members 65 and 67 (FIG. 3) are provided in the chamber defined by the walls 52 an 62 so as to route the hot gases through the tubular heat exchanger in a predetermined fashion. Specifically, the smoke and hot gases pass through the tubes 64a, 64b and 64c and through heat exchanger tubes 64d, 64e and 64f from the rear of the cabinet toward the front thereof. These hot gases are then returned to the rear portion of the cabinet by way of the five horizontally extending heat exchanger tubes 64i through 64m. The smoke and hot gases exiting from the rear ends of the tubes 64i through 64m then pass through an exit port 66 which is adapted to be connected to the chimney or flue of the building.

In order to support combustion of the fuel, a draft inducing blower 68 is coupled via a tube 70 passing through an aperture formed in the rear panel 14 of the cabinet. The tube 70 leads to a pair of elongated diffusion nozzles, a portion of which are illustrated in FIG. 3 by numerals 72 and 74. The diffusion nozzles serve to spread out the air into well defined channels and are located proximate the location where the fuel is being burned. The interior of the firebox 42 is also provided with additional fire brick members 76 and 78 which help to ensure uniform combustion of the solid fuel. As is indicated in FIG. 3, the fire brick members 76 and 78 slant inwardly and downwardly such that as the fuel loaded therebetween is consumed, gravity will cause a flow of solid fuel downward towards the location of the diffusion nozzles 72 and 74. Thus, as the fuel is consumed, a new supply is brought into the combustion area.

Located proximate the front panel 12 of the furnace cabinet is a baffle plate 80 (FIG. 2) which, in turn, is surrounded by a spaced apart interior baffle plate 82. Secondary air entering the ports 36 in the front panel 12 pass upward in the space between the baffle 80 and the front panel 12 and then downward in the spacing between the baffle plate 80 and the surrounding baffle plate 82. The exiting secondary air is thus directed into the zone in the firebox 42 beneath the fire bricks 60 which is the location at which unburned products of combustion tend to concentrate. The additional oxygen afforded by the secondary air allows a more complete burning of this volatile material. The residue of the hot gases and smoke then travel upward through the chamber defined by the panels 52 and 62, all as previously described.

Located in the chamber between the panels 52 and 62 is a thermocouple temperature sensing element 84, the purpose of which will be further described hereinbelow when the details of the control circuitry is set forth.

As was mentioned earlier, the cleanout of creosote and other particulate material which may condense on the interior surfaces of the heat exchanger tubes 64 is facilitated by providing the access door 30 therein. By removing the two screws 86, the access door 30 may be removed, allowing a scraper member to be pushed through the tubes forcing the particulate matter rearward where it ultimately exits from the ends of the heat exchanger tubes and drops downwardly into the zone of the firebox located below the fire bricks 60. There it mingles with ash and other products of combustion and can be periodically removed via the access door 24.

Extending outwardly through an aperture formed in the front panel 12 is a rod 88 which has a handle knob 90 on the exterior end thereof and which is slidable for rotation in a bracket member 92. Attached to the opposite end of the rod is a circular plate 94 which blocks a port formed in the plate 62. By sliding the rod 88, i.e. by pulling on the knob 90, it is possible to open this port providing a bypass of the heated air out to the chimney. Air entering the apertures 36 (FIG. 1) is directed through the fire chamber in flowing to the above-mentioned port in plate 62. The position of the plate 94 relative to that port limits the gas flow and therefore the fire size. The port in panel 62 is sufficiently small to limit the fire size and preclude a runaway condition.

Now that the details of the construction of the solid fuel burning furnace itself has been described, consideration will next be given to the electrical circuitry which is utilized to make this unit compatible with a conventional fluid fueled furnace.

Figure 5A:
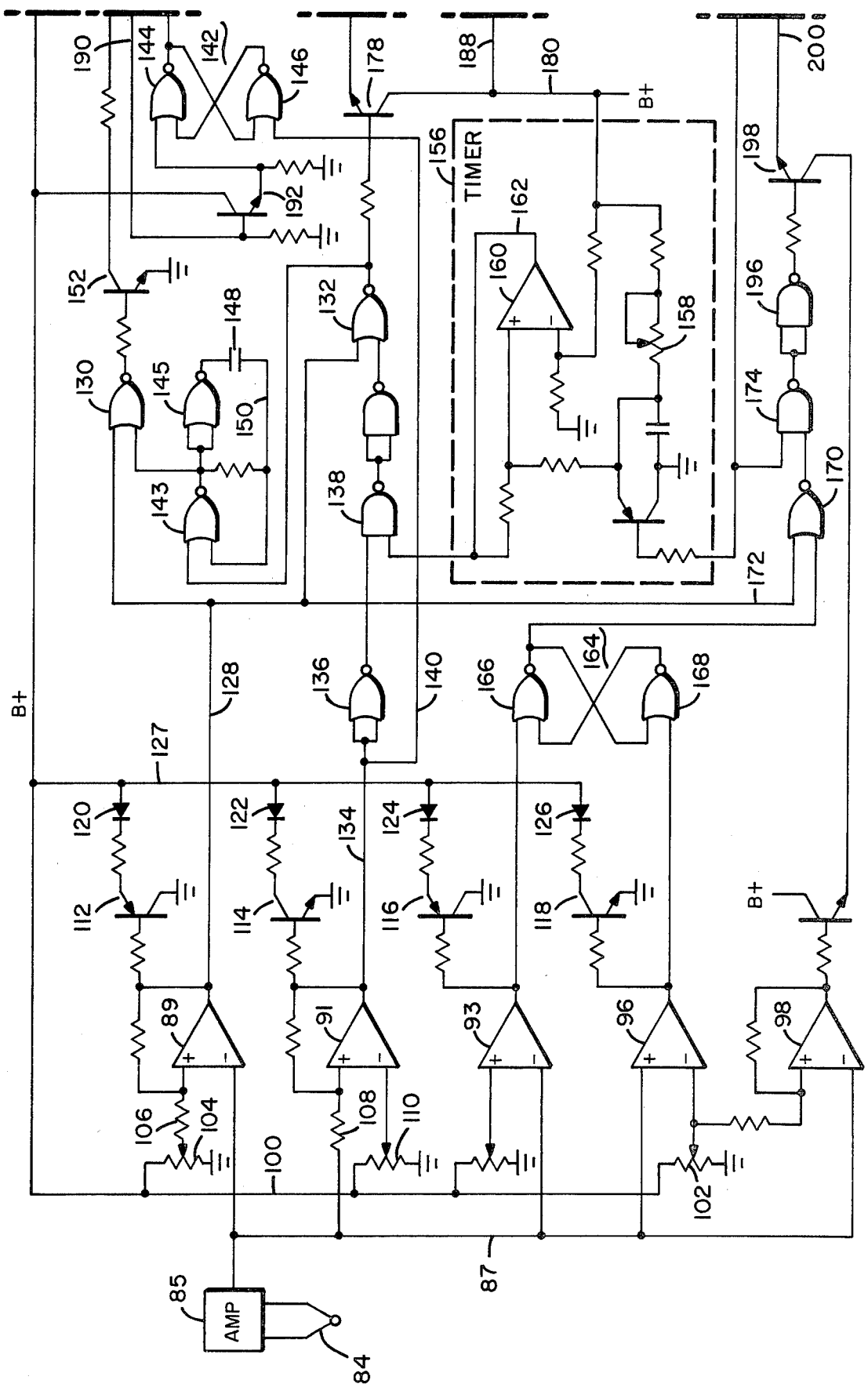

Referring to the schematic electrical diagram of FIGS. 5a and 5b, there is shown the construction of a control circuit utilized in the solid fuel furnace system of the preferred embodiment. Shown in FIG. 5a is the thermocouple element 84 used to sense the temperature at a predetermined point within the furnace structure. The output from the thermocouple element is amplified in amplifier 85 and fed by way of a bus 87 to a plurality of comparator networks 89, 91, 93, 96 and 98. Another bus 100 is coupled to a source of voltage B+ and at its other end through a potentiometer 102 to ground. The comparator 89 has its minus input connected to the bus 87 and its positive input connected to the bus 100 by way of a potentiometer 104 and a resistor 106. In a similar fashion, the comparator 91 has its positive input coupled by way of a resistor 108 to the bus 87. A potentiometer 110 couples the negative input of the comparator 91 to the B+ bus 100. Also, the inputs to the comparators 93, 96 and 98 are coupled, either through a potentiometer to the bus 100 or to the output of the amplifier 85 by way of the bus 87. The output from each of the comparators 89, 91, 93 and 96 are coupled through driver transistors 112, 114, 116 and 118 and through LED devices 120 through 126 to the source of B+ voltage by way of a conductor 127. Thus, by adjusting the wiper arm of the potentiometers 102, 104, 110 etc. the values which the amplified output of the thermocouple are being compared to may be adjusted to establish desired threshold levels.

When the threshold established by the potentiometer 104 is exceeded by the amplified output from the thermocouple 84, the output from the comparator 89 goes from a relatively high signal to a low signal, turning on the NPN transistor 112 and causing the LED 120 to be illuminated. The threshold for the comparator 89 is set so that when the temperature in the furnace exceeds a lower threshold this output signal will be produced to indicate that a fire is present in the furnace.

Comparator 91, on the other hand, establishes a second threshold above the first threshold set by potentiometer 104. Thus, when this second threshold is exceeded, the output from the comparator 91 will go from a low signal to a high signal to turn on the NPN transistor 114, causing the LED 122 to be illuminated. As will be explained further on hereinbelow, the output from the comparator 91 establishes a temperature differential signal which differential must be exceeded in a predetermined time period to prevent switch over to the auxiliary fluid fired furnace unit.

The output from the comparator 93 occurs when the thermocouple output signal exceeds a threshold established by its associated potentiometer input. When the threshold established by this potentiometer is exceeded, the comparator 94 outputs a signal which goes from a high to a low, thereby turning on the driver transistor 116 and causing its associated LED 124 to glow. This signal is used to turn on the draft inducing blower to introduce an increase in the oxygen supply furnished to the combustion chamber of the furnace.

The comparator 96 establishes a still higher threshold by virtue of the setting of potentiometer 102. When this upper threshold is exceeded by the output from the amplifier 85, comparator 96 outputs a signal which goes from a low value to a high value, turning on transistor 118 and causing the LED 126 to glow. This signal, as will be further explained, causes the draft inducing blower to shut off. As a result, the air supply to the furnace is modulated as a function of temperature.

The output from the comparator 89 is coupled by way of a conductor 128 to a first input of a NOR circuit 130 and to a first input of a NOR circuit 132. The output from the comparator 91 is coupled by way of a conductor 134 and through an inverter 136 to a first input of a NAND gate 138. This output on line 134 is also coupled by a conductor 140 to the clear side of a flip-flop 142 comprised of cross-coupled NOR circuits 144 and 146.

The output from NOR circuit 132 is connected by a conductor to a first input of NOR circuit 143. The output of this NOR circuit is coupled as an input to an inverter 145 whose output is coupled through a capacitor 148 and a conductor 150 back to a second input of the NOR gate 143. Those skilled in the art will recognize that this configuration will act as a relaxation oscillator causing the output of the NOR gate 130 to alternately assume high and low levels at a predetermined rate. When the output signal from the inverter 130 goes high, the transistor driver 152 is turned on, causing the LED 154 to flash on and off. The LED 154 is located proximate the thermostat in the area being heated and acts as a signal to the occupant that the fluid fueled furnace system is operational but is incapable of satifying the heat load requirements. When the LED 154 glows steadily, however, it is an indication that the solid fuel furnace system is operational to provide the heating demand for the building space.

The timer network includes the circuitry shown enclosed by dashed line box 156. By adjusting the wiper arm on the potentiometer 158, the time interval to be indicated by the time unit 156 can be adjusted anywhere from 2 to 7 minutes. The output from the timer appears at the output terminal of the operational amplifier 160 and is applied by way of a conductor 162 to a second input of the NAND gate 138. From the time that the thermostat contacts 164 (FIG. 5b) close, the timer unit begins to run and unless the output from the comparator 92 switches from low to high to indicate that the second threshold level has been exceeded, the LED 154 will flash, all as previously described. However, until the time period established by the timer unit 156 has elapsed, the fluid fuel furnace will remain inactive. As such, the solid fuel fired furnace is allowed a predetermined interval in which to build up its heating capacity and only if it fails to exceed a threshold prior to the elapsed time, will the fluid fueled furnace become activated.

The output from the comparators 93 and 96 are coupled as inputs to the set side and clear side of a flip-flop 164 comprised of cross-coupled NOR circuits 166 and 168. Thus, when the output from comparator 93 reverts from a high signal to a low signal upon the output from the thermocouple amplifier 85 exceeding the threshold established by the comparators input potentiometer, the flip-flop 164 will be switched to its set state. However, when the temperature continues to climb such that the output from the amplifier 85 exceeds the threshold established by the potentiometer 102, the output from comparator 96 will produce a signal to clear the flip-flop 164.

The output from the flip-flop 164 is connected as a first input to a NOR gate 170 whose other input comes from the output of comparator 89 by way of conductor 128 and conductor 172. Thus, when the thermocouple amplifier output is indicating the presence of a fire and the comparator 96 is indicating that the temperature within the furnace is below an upper limit, the NOR gate 170 will be satisfied and will apply a signal to NAND gate 174.

Enclosed by broken lined box 176 is a manually operable double pole-double throw switch having a momentary on position, an off position and a steady on position. When the thermostat contacts 164 are closed and the manual switch 176 is in its on position, the transistor 178 will rendered conductive at the time the output from the comparator 91 establishes that the preset temperature threshold for it has been exceeded within the period established by the timer. When transistor 178 turns on the B+ voltage on conductor 180 is applied through the transistor 178 and through the contacts of the switch 176 to energize the relay coil 182. Energization of this relay coil causes the switch contacts 184 and 186 to reverse from the position illustrated in FIG. 5b. Thus, when the relay 182 is energized, the fluid fuel fired furnace will be turned off such that the solid fuel furnace is provided all of the required heating need. The B+ voltage on conductor 180 will also be applied by way of the conductor 188 and through the now-closed switch contact 186 and the closed thermostat contact 164 and the switch contact 184 to the conductor 190 which is coupled to the base electrode of a NPN transistor 192. Thus, this last mentioned transistor will be turned on and the flip-flop 142 will be set. The resulting output from the set side of the flip-flop 142 is coupled through an inverter 194 back to the second input of the NAND gate 174. Thus, the conditions for this gate will be satisfied and inverter 196 will output a signal which permits a B+ voltage to be applied through the transistor 198 and conductor 200 and through the ON contacts of the manually operable switch 176 to thereby energize the relay coil 202. With relay coil 202 energized, 115 volts A.C. will coupled across the draft inducing blower motor 204.

As already explained, turning on the blower 204 affords more oxygen to the fuel contained in the furnace allowing it to burn at a greater rate and to produce more heat output. However, when the temperature in the furnace as sensed by the thermocouple 84 exceeds a given threshold established by the potentiometer 102 associated with the input of the comparator 96, the comparator 96 will output a signal to clear the flip-flop 164 which operates through the gates 170, 174 and 196 to render the transistor 198 non-conductive. With transistor 198 non-conductive, the B+ supply is removed from the relay coil 202 and the contacts 206 associated therewith reopen to disconnect the draft inducing blower 204 from the A.C. mains.

With the blower disconnected, less oxygen is made available to the fire and it burns less actively, causing the temperature in the furnace to ultimately drop below the threshold established for the comparators 93 and 96. Thus, the flip-flop 164 is again set and the blower is again turned on.

Thus it can be seen that the control circuit of the present invention permits a solid fuel burning furnace to work in harmony with a gas fueled furnace, the solid fuel furnace having priority, provided it is capable of producing sufficient heat within a given time period. Only if it fails to meet these requirements will the fluid fueled furnace become active.

What is claimed is:

1. A solid fuel burning furnace to be used in combination with a fluid fuel furnace heating system, comprising:
   (a) a cabinet;
   (b) a firebox means located within said cabinet for holding solid fuel to be burned;
   (c) a first enclosed chamber means formed in said cabinet connected to said firebox for channeling hot gas-laden air to the upper portion of said cabinet;
   (d) first and second sets of tubular heat exchange members, the first set having one open end entering said enclosed chamber for receiving said hot gas laden air and transporting same to a location proximate the opposite end of said tubular heat exchange members;
   (e) manifold means at said location for routing said hot gas laden air back through said second set of tubular heat exchange members;
   (f) an outlet port means coupled to the end of said second set of tubular heat exchange members for passing said gas laden air to a chimney; and
   (g) a second chamber means within said cabinet which is isolated from said first chamber for routing fresh air from the base of said cabinet and over the exterior surfaces of said first and second sets of tubular heat exchange members;
   (h) a temperature-sensing element means located in said cabinet for producing an electrical signal proportional to the temperature therein;
   (i) means for comparing said electrical signal to a first threshold and for producing a control signal when said electrical signal exceeds said first threshold;

(j) means responsive to a call for heating in the space being heated for initiating a time interval of a predetermined length; and
(k) means for turning on said fluid fuel furnace if said electrical signal fails to exceed said first threshold during said time interval.

2. Apparatus as in claim 1 and further including a draftinducing blower connected to said cabinet to provide combustion air to said firebox; and means for comparing said electrical signal to second and third threshold values for producing blower control signals whereby said blower is turned on when said electrical signal exceeds said second threshold value and is turned off when said electrical signal exceeds said third threshold value.

* * * * *